Figure 2:
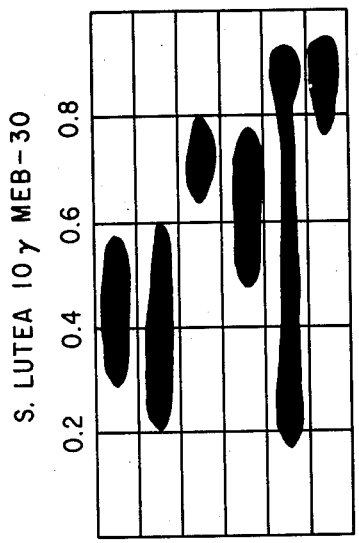

April 23, 1963   M. E. BERGY ET AL   3,086,912
ANTIBIOTIC LINCOLNENSIN AND METHOD OF PRODUCTION
Filed July 3, 1961   2 Sheets-Sheet 1

MALCOLM E. BERGY
ROSS R. HERR
DONALD J. MASON
INVENTORS

BY
ATTORNEYS

United States Patent Office 3,086,912
Patented Apr. 23, 1963

3,086,912
ANTIBIOTIC LINCOLNENSIN AND METHOD OF PRODUCTION
Malcolm E. Bergy and Ross R. Herr, Kalamazoo, Mich., and Donald Joseph Mason, Portage Township, Kalamazoo County, Mich., assignors to The Upjohn Company, Kalamazoo, Mich., a corporation of Delaware
Filed July 3, 1961, Ser. No. 121,696
10 Claims. (Cl. 167—65)

This invention relates to a novel composition of matter and to a process for the production thereof. More particularly, this invention relates to a new compound, lincolnensin, and to a process for the production thereof.

Lincolnensin, also called lincomycin, is a biosynthetic product obtained as an elaboration product of a lincolnensin-producing actinomycete. It is a basic compound which has the property of adversely affecting the growth of various microorganisms, particularly Gram positive bacteria, and can be used either as the free base or as an acid addition salt, alone or in combination with other antibacterial agents, to prevent the growth of or to reduce the number of microorganisms present in various environments. For example, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of mammals and birds, either alone or in combination with antibiotics.

The actinomycete used according to this invention for the production of lincolnensin has been designated as *Streptomyces lincolnensis* var. *lincolnensis*. One of its strain characteristics is the production of lincolnensin. A subculture of this variety can be obtained from the permanent collection of the Northern Utilization and Research Division, Agricultural Research Service, U.S. Department of Agriculture, Peoria, Ill., U.S.A. Its accession number in this repository is NRRL 2936.

*Streptomyces lincolnensis* var. *lincolnensis* has a compact cream pink aerial growth, yellow-tan vegetative growth and is melanin positive. Spore chains are flexuous. Spores are smooth. Its growth characteristics on standard biological media and its carbon assimilation are given in the following tables.

TABLE I

*Appearance on Ektachrome* [1]

| Agar medium | Surface | Reverse |
|---|---|---|
| (1) Bennett's | Cream pink | Brown. |
| (2) Czapek's Sucrose | do | Yellow tan. |
| (3) Maltose tryptone | do | Brown. |
| (4) Peptone iron | Trace cream pink | Do. |
| (5) 0.1% tyrosine | do | Trace brown. |
| (6) Casein starch | Cream pink | Yellow tan. |

[1] Dietz, A., Ektachrome transparencies as aids in actinomycete classification, Annals of the New York Academy of Science 60: 152–154, 1954.

TABLE II

*Assimilation of Carbon Compounds in Synthetic Medium* [1]

| | | | | | |
|---|---|---|---|---|---|
| D-xylose | + | Cellobiose | + | Salicin | (+) |
| L-arabinose | (+) | Raffinose | + | Na formate | (−) |
| Rhamnose | + | Dextrin | + | Na oxalate | (−) |
| D-fructose | + | Inulin | + | Na tartrate | (−) |
| D-galactose | + | Soluble starch | + | Na salicylate | − |
| D-glucose | + | Glycerol | + | Na acetate | (+) |
| D-mannose | + | Dulcitol | (−) | Na citrate | (+) |
| Maltose | + | D-mannitol | + | Na citrate | (+) |
| Sucrose | + | D-sorbitol | (−) | | |
| Lactose | + | Inositol | + | Control | (−) |

NOTE.—+ equals good growth, positive assimilation. (+) equals slight growth, positive assimilation. (−) equals slight growth, no assimilation. − equals no growth.
[1] Pridham, T. G. and Gottlieb, D., "Assimilation of Carbon Compounds in Synthetic Medium," J. Bact. 56: 107–114, 1948.

TABLE III

*Cultural Characteristics*

| Medium | Aerial | Vegetative | Other |
|---|---|---|---|
| Plain gelatin | None | Colorless dropping to base. | Brown pigment. Complete liquefaction. |
| Nutrient gelatin | do | do | Do. |
| Nutrient nitrate broth | White on surface ring | Colorless | Yellow tan pigment. No reduction. |
| Synthetic nitrate broth | White on surface pellicle | Colorless, slightly flocculent throughout and at base. | Trace yellow pigment. No reduction. |
| Litmus milk | Pink-white on surface ring | Blue | Peptonization. pH 7.5. |
| Peptone-iron agar | Pink-white | Brown | H₂S darkening. |
| Calcium malate agar | Cream-pink | Cream | Malate solubilized. |
| Skim milk agar | Pink-white | Yellow | Yellow tan pigment. Casein hydrolyzed. |
| Glucose asparagine agar | Cream pink | Yellow tan | Trace yellow pigment. |
| Casein starch agar | Cream | Yellow | Starch hydrolzyed. |
| Nutrient starch agar | do | do | Do. |
| Tyrosine agar | do | Brown | Brown tan pigment. Tyrosine solubilized. |
| Xanthine agar | do | Yellow | Yellow pigment. Xanthine solubilized. |
| Maltose tryptone agar | Olive green | Brown | Tan pigment. |
| Bennett's agar | Cream | do | Tan pigment. Good growth and sporulation at 18, 24, 28°; fair at 37°; slight vegetative at 55°. |
| Czapek's sucrose agar | do | Olive tan | Yellow pigment. Good growth and sporulation at 18, 24, 28°; fair at 37°; slight vegetative at 55°. |

The new compound of the invention is produced when the elaborating organism is grown in an aqueous nutrient medium under submerged aerobic conditions, and preferably in a nutrient medium containing a carbon source, for example, an assimilable carbohydrate, and a nitrogen source, for example, an assimilable nitrogen compound or proteinaceous material. It is to be understood also that for the preparation of limited amounts surface cultures in bottles can be employed.

Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewer's yeast with milk solids, soybean meal, cottonseed meal, corn meal, milk solids, pancreatic digest of casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40° C. and preferably between about 26° and 30° C. Ordinarily, optimum production of the compound is obtained in from about 2 to 10 days. The medium normally stays fairly close to neutral, or on the alkaline side, during the fermentation. The final pH is dependent, in part, on the initial pH of the culture medium which is advantageously adjusted to about pH 6–8 prior to sterilization, and the buffers present, if any.

When growth is carried out in large vessels and tanks, it is preferable to use the vegetative form of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessel or tanks. The medium in which the vegetative inoculum is produced can be the same as, or different from, that utilized for the production of the new compound as long as it is such that a good growth of the microorganism is obtained.

The new compound of the invention is a nitrogenous base having the empirical formula $C_{18}H_{34}N_2O_6S$. It is monobasic having a pKa' of 7.6 and under ordinary conditions is more stable in the protonated, that is, salt form. It is soluble in lower-alkanols, e.g., methanol, ethanol, isopropanol, the butanols, and the like; lower-alkyl esters of lower-alkanoic acids, e.g., ethyl acetate, n-butyl acetate, amyl acetate, and the like; lower-alkanones, e.g., acetone, methyl ethyl ketone, isopropoyl n-butyl ketone, and the like; and chlorinated lower-alkanes, e.g., methylene chloride, chloroform, ethylene dichloride, and the like. It has some solubility in water but can be extracted from aqueous solutions with water-immiscible solvents, e.g., n-butanol, n-butyl acetate, methyl ethyl ketone, methylene chloride, and the like.

In accordance with a preferred procedure for the recovery of the new compound of the invention, the whole beer is adjusted, if necessary or desirable, to a near neutral pH or below, suitably between pH 2 and pH 8 and filtered. A filter aid, for example, diatomite can be used. The pH of the filtered beer is then adjusted to place the compound in the non-protonated form. This is accomplished by neutralizing the solution with suitable base, for example, sodium hydroxide or sodium carbonate, to a pH greater than pH 7.5, advantageously to a pH from 9 to 11. The resulting solution is then extracted with a water-immiscible solvent and the new compound recovered from the solvent phase. If desired, the solvent phase can be acidified and the new compound recovered in the protonated form. This can be accomplished by precipitating the new compound as an insoluble salt or by extracting the solvent extract with an aqueous solution of an acid which forms a water soluble salt, for example, hydrochloric acid, sulfuric acid, phosphoric acid, and acetic acid. Advantageously, the latter is accomplished by adjusting the pH to less than 7.5, preferably from pH 2 to pH 6. The salt is then recovered by evaporation and/or crystallization.

If desired, the above extraction procedure can be repeated as necessary to effect desired purification before the salt is recovered. Also a change of water-immiscible solvent can be utilized to effect further purification. For example, methylene chloride can be utilized to wash out impurities from the aqueous solutions of the salt form or to extract the free base from aqueous solutions of the non-protonated compound.

The new compound of the invention can also be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene obtained by the procedure given in page 84 of Kunin, supra. Sulfonated cation exchange resins of this type are marketed under the trade names, Dowex 50, Amberlite IR–120, Nalcite HCR, Chempro C–20, Permutit Q, and Zeokarb 225.

The protonated antibiotic is eluted from the resin with water at an acid pH, advantageously at a pH lower than the pKa' of the cation exchange resin used. Satisfactory results are obtained with a pH of about 1 to 6. The excess acid in the eluate is neutralized to about pH 6 to 7 with NaOH or a strongly basic anion exchange resin so as to remove excess acid over that necessary to protonate the basic groups. Suitable anion exchange resins for this purpose are obtained by chlormethylating by the procedure given on pages 88 and 97 of Kunin, supra, polystyrene crosslinked, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex 2, Dowex 20, Amberlite IRA–400, Duolite A–102, and Permutit S–1.

The novel compound of the invention can also be recovered from harvest beers and other aqueous solutions by adsorption on a surface active absorbent, for example, decolorizing carbon or decolorizing resins, and eluting the adsorbed material with a solvent. Any of the solvents mentioned above can be used. A suitable decolorizing resin is Permutit DR (U.S. Patent 2,702,263).

The new compound of the invention can be purified by successive transfers from protonated to nonprotonated forms and vice versa, especially with intervening other types of treatments, as for example, solvent extractions and washings, recrystallization, and fractional liquid-liquid extractions. It can also be purified by conversion of the protonated or nonprotonated compounds to less soluble forms, for example by reaction with helianthic acid, Reinecke's acid, azobenzene sulfonic acid, picric acid, and the like. The salts thus obtained can be used for the same purpose as the free base, or they can be converted back to the free base and then converted to other salts such as the hydrochloride, phosphate, and sulfate.

Fractional liquid-liquid extraction is accomplished in partition chromatographic columns or in countercurrent distribution apparatus, using such solvent systems as cyclohexane-methyl ethyl ketone-pH 10 buffer (7:3:2, by volume) and 2-butanol-water (1:1, by volume).

Recrystallization is accomplished by dissolving the crystalline salt in water, adding a water-miscible solvent, e.g., acetone, methanol, ethanol, or isopropanol, and cooling to induce or complete crystallization. The crystals are filtered and washed with water-solvent solution and, if desired, by anhydrous solvent, and then vacuum dried.

The salts can be converted to the free base by neutralizing with an alkali or by contacting with an anionic resin, advantageously to about pH 9 to 11. Specific acid salts can then be made by neutralizing the free base with the appropriate acid to below about pH 7.5, and advantageously to about pH 2 to pH 6. Suitable acids for this purpose include hydrochloric, sulfuric phosphoric, acetic, succinic, lactic, maleic and fumaric, methanesulfonic, benzenesulfonic, helianthic, Reinecke's, azobenzenesulfonic, picric, and like acids.

The new compound of the invention is active against bacteria, for example, *Streptococcus lactis*, which cause the souring of milk, and can be used to prevent or delay souring of dairy products, for example, milk and cheese. Concentrations as low as 1.6 mcg./ml. can be used. The new compound has little oral toxicity. Its $LD_{50}$, in rats, the dose lethal to 50% of the animals, exceeds 3000 mg./kg. The new compound can also be used to inhibit Gram-positive sporeformer spreaders on agar plates when isolating molds, yeasts, Streptomycetes, and Gram-negative organisms. It can be used, for example, in the isolation of microorganisms from soil samples as well as in the isolation of Gram-negative organisms, for example, Pseudomonas, Proteus, and *Escherichia coli*, from mixed infections in the presence of staphylococci and/or streptococci.

The following examples are illustrative of the process and products of the present invention, but are not to be construed as limiting. All percentages are by weight and all solvent mixture proportions are by volume unless otherwise noted.

EXAMPLE 1

A. A soil slant of *Streptomyces lincolnensis* var. *lincolnensis*, NRRL 2936 was used to inoculate a series of 500-ml. Erlenmeyer flasks each containing 100 ml. of seed medium consisting of the following ingredients:

| | Grams |
|---|---|
| Yeastolac [1] | 10 |
| Glucose monohydrate | 10 |
| N-Z-Amine B [1] | 5 |
| Tap water, q.s., 1 liter. | |

[1] Yeastolac is a protein hydrolysate of yeast cells and N-Z-Amine B is Sheffield's enzymatic digest of casein.

The seed medium presterilization pH was 7.3. The seed was grown for two days at 28° C. on a Gump rotary shaker operating at 250 r.p.m.

B. A 5% inoculum of the seed described above (5 ml.) was added to each of thirty 500-ml. Erlenmeyer flasks each containing 100 ml. of the following fermentation medium:

| | Grams |
|---|---|
| Glucose monohydrate | 20 |
| Molasses | 20 |
| Corn steep liquor | 20 |
| Wilson's peptone liquor #159 [1] | 10 |
| Calcium carbonate | 4 |
| Tap water, q.s., 1 liter. | |

[1] Wilson's peptone liquor #159 is a preparation of enzymatically hydrolyzed proteins from animal origin.

The pH of the medium after sterilization was 7.0. The shake flasks were harvested after four days of fermentation at 28° C. on a Gump rotary shaker at 250 r.p.m. The harvested beer was at pH 8.6.

Figure 1:
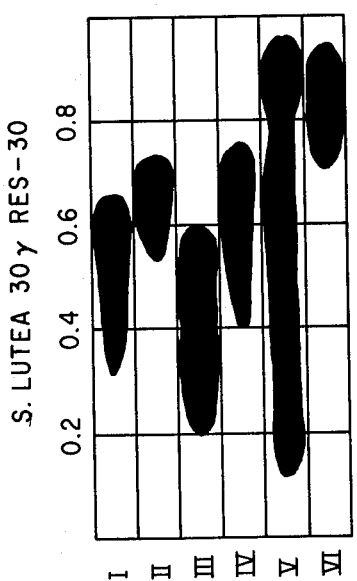

C. The whole beer (2430 ml.) was filtered at harvest pH (pH 8.6) using a filter aid as required. The cake was washed with ⅕ volume (490 ml.) of water. The wash was added to the filtered beer and the cake discarded. The clear beer was adjusted to pH 10 with 50% aqueous NaOH solution and extracted twice with ⅓ volume of 1-butanol. The extracts were combined and the spent beer discarded. To the butanol extract was added ½ volume of water. The water-butanol mixture was adjusted to pH 2.0 under constant agitation with concentrated sulfuric acid (95%). The mixture was allowed to equilibrate and the phases were separated. The extract phase was discarded. The raffinate phase was adjusted to pH 10 with 50% aqueous NaOH solution and extracted twice with ⅓ volume of 1-butanol. The combined 1-butanol extracts were washed with 1/10 volume of water. The washed 1-butanol extracts were concentrated in vacuo to a dried residue (RES–30) having the characteristic papergram pattern shown in FIGURE 1. The solvent systems were as follows:

I. 1-butanol-water (84:16 v./v.), 17 hrs.
II. 1-butanol-water (84:16 v./v.) plus 0.25% p-toluenesulfonic acid (w./v.), 16 hrs.
III. 1-butanol-acetic acid-water (2:1:1 v./v.), 16 hrs.
IV. 1-butanol-water (84:16 v./v.) plus 2% piperidine (v./v.), 16 hrs.
V. 1-butanol-water (4:96 v./v.), 5 hrs.
VI. 1-butanol-water (4:96 v./v.) plus 0.25% p-toluenesulfonic acid (w./v.), 5 hrs.

The long tailing in solvent system V is characteristic of pure lincolnensin, but sometimes does not occur with beers or impure preparations.

The material balance is given in the following table:

| Fraction | Volume (ml.) | Assay [1] (biounits/ml.) | Total biounits |
|---|---|---|---|
| Whole beer | 2,430 | 28.5 | 61,255 |
| Clear beer plus wash | 2,020 | 20 | 40,400 |
| 1st butanol extract | 1,380 | 40 | 55,200 |
| Spent beer | 1,890 | 0.6 | 1,134 |
| Aqueous extract | 770 | 50 | 38,500 |
| Spent butanol | 1,360 | 1.3 | 1,768 |
| 2nd butanol extract | 635 | 62 | 39,370 |
| Spent aqueous | 640 | 1.2 | 768 |
| Dried prep (RES–30) | [2] 268.5 | [3] 140 | 37,590 |

[1] Assayed against *Sarcina lutea* on agar buffered to pH 6–8 with pH 7.0 Phosphate buffer (0.1 M). A unit volume (0.08 ml.) of solution containing the material to be assayed is placed on a 12.7 mm. assay disc which is then placed on an agar plate seeded with the assay microorganism. A biounit is that amount of material per ml. which, when contained in one ml. of solution, gives a zone of inhibition of 20 mm. when a unit volume of solution is assayed as above under standard microbiological conditions.
[2] Mg.  [3] Biounits/mg.

This preparation gave almost complete protection at 5 mg./kg. (subcutaneously) of *Streptococcus hemolyticus* infected mice. This was the lowest level tested. In mice infected with *Staphylococcus aureus*, the $CD_{50}$ was 23.8 (17.0–30.6) mg./kg. (subcutaneously).

This preparation had the following in vitro spectrum.

Test Organisms:     [1] MIC($\gamma$/ml.)

| | |
|---|---|
| *Diplococcus pneumoniae* | <1 |
| *Escherichia coli* | 1000 |
| *Klebsiella pneumoniae* | 500 |
| *Pasteurella multocida* | 8 |
| *Proteus vulgaris* | 1000 |
| *Pseudomonas aeruginosa* | >1000 |
| *Salmonella paratyphi* | >1000 |
| *Salmonella pullorum* | 250 |
| *Salmonella typhi* | 500 |
| *Staphylococcus aureus* | <1 |
| *Staphylococcus albus* | <1 |
| *Streptococcus fecalis* | <1 |
| *Streptococcus hemolyticus* | <1 |
| *Streptococcus viridans* | <1 |
| *B. subtilis* | 64 |

[1] Minimum inhibitory concentration at 2-fold dilutions in brain-heart broth.

EXAMPLE 2

A. *Fermentation*.—Two 250-liter fermentations were conducted in the following manner:

a. Seed inoculum: A 40 liter fermentor containing 20 liters of the following sterile medium (pH 7.2)

| | |
|---|---|
| Glucose monohydrate | 10 g./liter. |
| Wilson's peptone liquor No. 159 | 10 g./liter. |
| Corn steep liquor | 10 g./liter. |
| Pharmamedia [1] | 2 g./liter. |
| Lard oil | 2 ml./liter. |
| Tap water | Balance. |

[1] Pharmamedia is an industrial grade of cottonseed flour produced by Traders Oil Mill Co., Fort Worth, Texas.

was inoculated with 100 ml. of a preseed inoculum, prepared according to Example 1, part A, and grown at 28° C. for two days while agitating with a stirrer at 400 r.p.m. and aerating at the rate of ten standard liters of air per minute.

b. Fermentation: Each of two 380-liter fermentors containing 250 liters of the following sterile medium (pH 6.45)

| | G./liter |
|---|---|
| Starch [1] | 20 |
| Black strap molasses | 20 |
| Corn steep liquor | 20 |
| Wilson's peptone liquor No. 159 | 10 |
| Calcium carbonate | 4 |
| Lard oil | 5 |
| Tap water | Balance |

[1] Glucose monohydrate can be used to replace all or part of the starch.

was inoculated with 12 liters of the seed inoculum and fermented at 28° C. for 5 days while agitating at 280 r.p.m. and aerating at the rate of 100 standard liters of air per minute. In one fermentor 700 ml. of sterile lard oil was added during the fermentation to control foaming and in the second, 900 ml. of sterile lard oil was added. At the end of the fermentation (114 hrs.), 250 liters of beer was harvested from the first fermentor (pH 7.9; assay, 24 biounits/ml.) and 210 liters from the second fermentor (pH 7.9; assay, 43 biounits/ml.).

B. *Extraction*.—The whole beer from the first fermentor was adjusted from a harvest pH 7.9 to pH 6.7 with 70 ml. of concentrated sulfuric acid and filtered using 4% filter aid. The filter cake was washed with 1/10 volume of water, based on the whole beer, and added to the clear beer. The clear beer (250 liters; assay, 20 biounits/ml.) was adjusted to pH 10 with 300 ml. of 50% aqueous sodium hydroxide solution, and extracted two times with 1/3 volume of 1-butanol. The combined 1-butanol extracts (160 liters; assay 28 biounits/ml.) were mixed with 1/2 volume of water (80 liters) and adjusted to pH 2 with 50 ml. of concentrated sulfuric acid. The aqueous extract (110 liters; assay, 36 biounits/ml.) was separated off, adjusted to pH 10.1 with 120 mls. of 50% aqueous sodium hydroxide solution and extracted two times with 1/3 volume of 1-butanol. The combined butanol extracts (80 liters; assay, 48 biounits/ml.) was washed with 1/10 volume of water. The washed butanol extract was freeze-dried to give about 21 g. of dried preparation (DEG 54–11), assaying 145 biounits/mg.

The procedure above was repeated on the whole beer of the second fermentation to give 105 g. of dried preparation (HRV 134–11) assaying 125 biounits/mg.

C. *Purification*.—Preparation DEB 54–11 and 24.31 g. of preparation HRV 134–11 were combined (combined weight, 45.48 g.; assay, 177 biounits/mg.) and dissolved in 252 ml. of water. The solution was adjusted to pH 2.0 with concentrated sulfuric acid and a brown precipitate was removed by filtration. The filtrate was extracted once with 250 ml. of methylene chloride to remove impurities. The aqueous layer (raffinate) was adjusted to pH 5.0 with 50% aqueous sodium hydroxide and extracted once with 250 ml. of methylene chloride. The methylene chloride extracts removed 3.6 grams of impurities at a potency of 12 biounits/mg.

The aqueous raffinate was adjusted to pH 10.2 with 50% aqueous sodium hydroxide and extracted 5 times with 250 ml. portions of methylene chloride. One hundred ml. of water was added to the combined extracts and the methylene chloride removed in vacuo. The resulting aqueous solution was freeze dried to give 32 grams of dry preparation (MEB 2) assaying 232 biounits/mg.

D. *Crystallization*.—Further purification of preparation MEB 2 was accomplished by use of a partition column. The column was prepared and developed as follows: A solvent system consisting of cyclohexane, methyl ethyl ketone, and pH 10 buffer (70:30:20 by volume) was thoroughly mixed and equilibrated. (The pH 10.0 buffer was made by adding sufficient $NaHCO_3$ to a 0.2 M $Na_2CO_3$ solution to adjust the pH to pH 10.0). One hundred grams of diatomite was slurried in upper phase of the system described above; forty ml. of lower phase was added and the whole slurry homogenized. This solvent-diatomite mixture was poured into a glass column (1¼″ inside diameter) and packed to a constant height using 2 p.s.i. gauge of air pressure. The feed for the column, 2.5 g. of preparation MEB 2, was dissolved in 2 ml. of lower phase and then homogenized with upper phase and placed onto the top of the column bed. The column was developed with upper phase at a rate of approximately 2 ml./minute. Two hundred 20-ml. fractions were collected. Fractions 1 through 85 were inactive; fractions 90 through 200 all possessed about the same activity.

Fractions 100 through 200 were pooled and concentrated in vacuo (less than 50° C.) to dryness. The residue was dissolved in 20 ml. of water and the pH was adjusted to pH 2.0 using concentrated hydrochloric acid. The aqueous solution was extracted 2 times with 10 ml. of 1-butanol and the aqueous raffinate was distilled in vacuo at less than 50° C. to 10 ml. to remove dissolved 1-butanol. Acetone (50–60 ml.) was added slowly to the aqueous concentrate and crystallization started. The aqueous acetone solution stood for 30 minutes at room temperature. The crystals were filtered off and vacuum dried to a constant weight. There was thus obtained 388 mg. of lincolnensin hydrochloride crystals (MEB 12) assaying 138 biounits/mg., having a melting point of 145–147° C., an optical rotation $[\alpha]_D$ +133 (water), no UV absorption maxima (220 to 400 millimicrons), and the following characteristic IR absorption.

| Group | Bands cm.$^{-1}$ |
|---|---|
| OH/NH | 3500 (shoulder), 3400, 3340, 3240, 3150, 3060. |
| | 6 µ region 1690, 1675, 1600, 1590. |
| | Other bands: 1315, 1305, 1276, 1265, 1233, 1155, 1140, 1115, 1100, 1093, 1078, 1042, 990, 985, 970, 875, 793. |

EXAMPLE 3

A solution of 5 grams of the amorphous material MEB 2 in 50 ml. of water was adjusted with hydrochloric acid to pH 2.0 (1 ml. of concentrated HCl) and extracted twice with 25 ml. portions of 1-butanol. The aqueous was then concentrated in vacuo at less than 50° C. to a volume of 25 ml. Four hundred ml. of acetone was added and the mixture was cooled to —5° F. The resulting crystals were removed by filtration, washed with acetone, and dried in vacuo to a constant weight yielding 3.46 g. of lincolnensin hydrochloride crystals (MEB 13) assaying 129 biounits/mg., having a melting point of 138–145° C., an optical rotation $[\alpha]_D$ +114 (water), and no UV absorption, maxima.

EXAMPLE 4

A solution of 23 grams of amorphous material MEB 2 in 100 ml. of water was adjusted with 4.1 ml. of concentrated hydrochloric acid to pH 1.8–2.0 and the solution was extracted with two 100 ml. portions of 1-butanol. The raffinate was then concentrated in vacuo at less than 50° C. to a volume of 50 ml. Seven hundred and fifty ml. of acetone was added and the mixture was cooled to —5° F. The crystals were removed by filtration, washed with acetone, and vacuum dried to a constant weight yielding 14.0 g. of lincolnensin hydrochloride crystals (MEB 14) assaying 120 biounits/mg., having the melting point of 145–146° C., an optical rotation $[\alpha]_D$ +139 (water), and no UV absorption, maxima.

EXAMPLE 5

Following the procedure of Example 2, parts A, B, and C, 12.7 g. of preparation MEB 147 assaying 270 biounits/mg. was obtained. After an unsuccessful effort to purify this material in a Craig countercurrent distribution apparatus charged with equal volumes of the equilibrated phases of a butyl acetate:water solvent system, the Craig fractions were pooled and concentrated to 100. mls. of aqueous solution (pH 9.1; assay, 168 biounits/mg.; solids, 82.57 mg./ml.; total solids, 8.26 g.). The pH was adjusted to pH 2.3 with 1.9 ml. of concentrated hydrochloric acid. The aqueous solution was extracted twice with 100 ml. portions of MEK (methyl ethyl ketone). The MEK extracts removed 471 mg. of impurities assaying 41 biounts/mg. The aqueous raffinate was stripped of the MEK by concentrating in vacuo. To the aqueous concentrate (40 ml.) was added 600 ml. of acetone. The solution was chilled to −5° F. and the crystals which separated were recovered by filtering, washed with acetone, and vacuum dried to constant weight. There was thus obtained 7.4 g. of lincolnensin hydrochloride crystals (MEB 19-1) having a melting point of 139–142° C., an optical rotation $[\alpha]_D$ of +138 (water), and no UV absorption, maxima.

EXAMPLE 6

Preparations MEB 13, MEB 14, and MEB 19-1 were pooled (total of 24.86 g.) and recrystallized from aqueous acetone by dissolving in 125 ml. of water and adding 1000 ml. acetone to effect crystallization. There was thus obtained 19.2 g. of lincolnensin hydrochloride crystals (MEB 20) having an optical rotation $[\alpha]_D$ +122 (water), an equivalent weight of 455, and the following elemental analysis.

*Analysis.*—Calcd. for $C_{18}H_{34}N_2O_6S \cdot HCl$ (½ $H_2O$): C, 47.83; H, 8.03; N, 6.20; O, 23.01; S, 7.09; Cl, 7.84. Found: C, 47.95; H, 7.81; N, 6.07; O, 22.93 (by difference); S, 7.21; Cl, 7.97; ash, 0.06.

Preparation MEB 20 has the following in vivo effectiveness in mice.

| Organism | $CD_{50}$ (mg./kg.) subcutaneously | $CD_{50}$ (mg./kg.) oral |
|---|---|---|
| Streptococcus hemolyticus | 0.81 | 3.8 |
| Diplococcus pneumoniae | 20 | 145 |
| Staphylococcus aureus | 7.1 | 16 |

The $CD_{50}$ is the dose effective to give 50% survival. The preparation has the following in vitro spectrum.

| Test organisms | MIC (γ/ml.)[1] | |
|---|---|---|
| | BHI | PYE |
| Diplococcus pneumoniae | 0.4 | NG |
| Escherichia coli | >100 | >100 |
| Klebsiella pneumoniae | 0.4 | 50 |
| Pasteurella multocida | >100 | 0.1 |
| Proteus vulgaris | >100 | >100 |
| Pseudomonas aeruginosa | >100 | >100 |
| Salmonella paratyphi | >100 | >100 |
| Salmonella pullorum | 100 | >100 |
| Salmonella typhi | >100 | >100 |
| Staphylococcus aureus | 0.2 | 0.8 |
| Staphylococcus albus | 0.1 | 0.4 |
| Streptococcus fecalis | 0.8 | 0.8 |
| Streptococcus hemolyticus | 0.4 | 0.4 |
| Streptococcus lactis | 0.4 | |
| Clostridium perfringens | 0.4 | |
| Clostridium tetani | 1.5 | |
| Bacillus subtilis | 25 | 50 |

[1] Minimum inhibitory concentration by two-fold dilutions in brain-heart infusion broth (BHI) peptone-yeast extract broth (PYE). End point at 20 hrs., 37° C. NG=no growth of the control.

Two grams of this preparation (MEB 20) was dissolved in 100 ml. of water and 100 ml. of 2-butanol. The starting material was placed in tubes 0–19 of a Craig countercurrent distribution apparatus and distributed through 500 transfers. The distribution was analyzed by running solid determinations, and an excellent agreement with the theoretical curve was obtained. Tubes from 100–140 were pooled.

Figure 3:
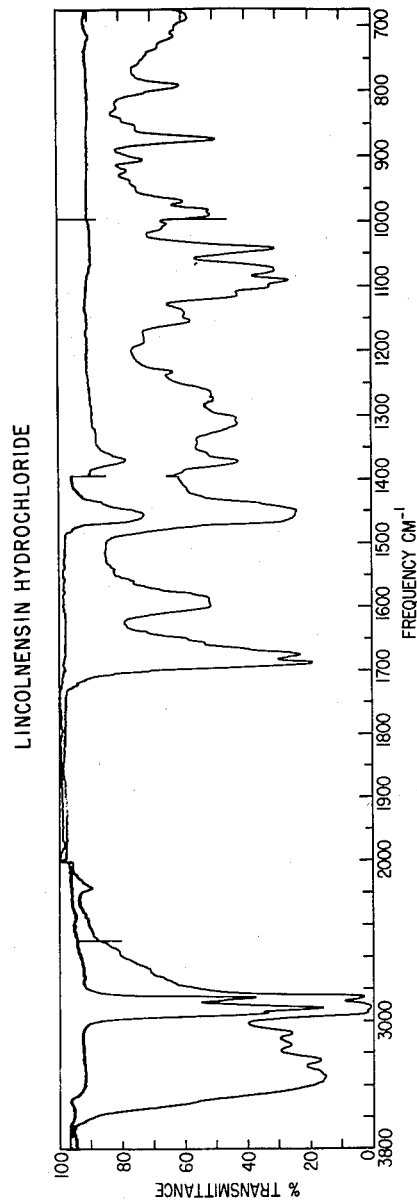

The pool from tubes 100–140 was concentrated to a volume of 10 ml., filtered through diatomite, and concentrated further to 5 ml. Fifty ml. of reagent grade acetone was added whereupon crystallization began. The mixture was chilled to −5° F. and the crystals were collected, washed with acetone, and vacuum dried to a constant weight. The yield was 1.42 grams of lincolnensin hydrochloride crystals (MEB 30) having a melting point of 135–140° C., an optical rotation $[\alpha]_D$+137° (water), no UV absorption, an equivalent weight of 454.7, pKa′ of 7.60, a molecular formula of $C_{18}H_{34}N_2O_6S \cdot HCl$ calculated from the equivalent weight, the elemental analysis, and the fact that only a single pKa′ was observed, a characteristic papergram pattern as shown in FIGURE 2, a characteristic IR absorption at the following frequencies expressed in reciprocal centimeters and as shown in FIGURE 3 of the drawing.

| | | | |
|---|---|---|---|
| 3340 (S) | 1600 (M) | 1145 (W) | 990 (M) |
| 3240 (S) | 1590 (M) | 1155 (M) | 985 (M) |
| 3150 (S) | 1450 (S) (oil) | 1140 (M) | 970 (W) |
| 3080 (S) | 1375 (M) (oil) | 1155 (M) | 924 (W) |
| 2930 (S) (oil) | 1315 (M) | 1100 (M) | 906 (W) |
| 2850 (S) (oil) | 1305 (M) | 1093 (S) | 875 (M) |
| 2160 (W) | 1276 (M) | 1078 (S) | 855 (W) |
| 1690 (S) | 1265 (M) | 1042 (S) | 827 (W) |
| 1675 (S) | 1233 (W) | 1006 (W) | 793 (W) (oil) |
| | | | 717 (W) |
| | | | 690 (M) | and the following elemental analysis.

*Analysis.*—Calcd. for $C_{18}H_{34}N_2O_6S \cdot HCl$ (½$H_2O$): C, 47.83; H, 8.03; N, 6.20; O, 23.01; S, 7.09; Cl 7.84. Found: C, 47.92; H, 7.96; N, 6.08; O, 23.22; S, 7.34; Cl, 7.94.

EXAMPLE 7

A. The procedure of Example 2, part A, was repeated and the two fermentations were combined to give 490 liters of whole beer assaying 11.2 biounits/ml. This beer was extracted by the procedure of Example 2, part B, to give 62.3 g. of a solid preparation (EAK 137-11) assaying 70 biounits/mg. The fermentation of Example 2, part A, was scaled up to a 2000 gallon fermentor to give 4900 liters of whole beer assaying 22 biounits/ml. which on extraction by the same procedure, except that the final butanol extract was not evaporated to dryness, gave 40 liters of aqueous solution (WTP 123-11) assaying 1000 biounits/ml.

B. Preparation EAK 137-11 was added to aqueous solution WTP 123-11 and the resulting 40 liters of solution was concentrated to 4 liters. This aqueous concentrate was adjusted from pH 8.0 to pH 2.0 with 40 ml. of concentrated sulfuric acid, and the resulting brown insoluble material was filtered off. The clear filtrate (pH 2.0) was extracted with 5.0 liters of methylene chloride. The raffinate was adjusted to pH 5.0 with 13 ml. of 50% aqueous sodium hydroxide and extracted again with 5 liters of methylene chloride. The raffinate was readjusted to pH 10.0 with 13 ml. of 50% aqueous sodium hydroxide and extracted 5 times with about 5 liters of methylene chloride for each extraction. The last five methylene chloride extracts were pooled and concentrated in vacuo to a volume of 700 ml., at which time 1.1 liters of deionized water was added. Concentration was continued until approximately 1500 ml. of aqueous solution remained. The aqueous concentrate was adjusted to pH 2.2 with 28.5 ml. of concentrated hydrochloric acid and extracted twice with 1 liter of 1-butanol. The raffinate was concentrated to a volume of 1.1 liters and 15 liters of acetone was added to promote crystallization. The aqueous acetone solution was held overnight at 0° C. The crystals were filtered off, washed with a small volume of acetone and dried in vacuo at room temperature, yielding (108 grams) of lincolnensin hydrochloride (WTP 123–18) assaying on repeated assays an average of 215 biounits/mg. (equivalent to 920 mcg. free base/mg.), having an equivalent weight of 451.3, an optical rotation $[\alpha]_D+137$ (water), no UV absorption maxima, and the following elemental analysis:

*Analysis.*—Calcd. for $C_{18}H_{34}N_2O_6S \cdot HCl$ (½$H_2O$): C, 47.83; H, 8.03; N, 6.20; O, 23.01; S, 7.09; Cl 7.84. Found: C, 47.61; H, 8.29; N, 6.40; O, 22.57 (diff.) S, 7.06; Cl, 8.02.

We claim:

1. A composition of matter assaying at least 20 mcg. per mg. of lincolnensin selected from the group consisting of
    (1) lincolnensin free base, a basic substance characterized by
        (*a*) being monobasic and having an equivalent weight of 454.7 and a pKa' of about 7.6,
        (*b*) having no UV absorption maxima from 220 to 400 millimicrons,
        (*c*) a calculated molecular formula of $$C_{18}H_{34}N_2O_6S$$

and, in the form of its crystalline hydrochloride by
        (*d*) characteristic infrared absorption in mineral oil mull at the following frequencies expressed in reciprocal centimeters: 3340, 3240, 3150, 3080, 2930, 2850, 2160, 1690, 1675, 1600, 1590, 1450, 1375, 1315, 1305, 1276, 1265, 1233, 1185, 1155, 1140, 1115, 1100, 1093, 1078, 1042, 1006, 990, 985, 970, 924, 906, 875, 855, 827, 793, 717, 690, and
    (2) the acid addition salts thereof.

2. A composition of matter consisting of lincolnensin free base as defined in claim 1.

3. The hydrochloride of lincolnensin as defined in claim 1.

4. An acid addition salt of lincolnensin as defined in claim 1.

5. A compound according to claim 4 in its essentially pure crystalline form.

6. The hydrochloride according to claim 4 in its essentially pure crystalline form.

7. A process which comprises cultivating *Streptomyces lincolnensis* var. *lincolnensis* in an aqueous nutrient medium under aerobic conditions until substantial activity is imparted to said medium by production of lincolnensin.

8. A process according to claim 7 in which the cultivation is effected at a temperature of about 18° C. to about 37° C. for a period between about 2 to 10 days.

9. A process which comprises cultivating *Streptomyces lincolnensis* var. *lincolnensis* in an aqueous nutrient medium containing a source of assimilable carbohydrate and assimilable nitrogen under aerobic conditions until substantial activity is imparted to said medium by production of lincolnensin and isolating the lincolnensin so produced.

10. A process according to claim 9 in which the isolation comprises extracting the culture medium with a water-immiscible solvent for lincolnensin and recovering lincolnensin from the solvent extract.

No references cited.